(12) United States Patent
Hinton et al.

(10) Patent No.: US 6,550,588 B2
(45) Date of Patent: Apr. 22, 2003

(54) OFF HIGHWAY TRUCK BRAKE ASSEMBLY AND WHEEL SPINDLE HAVING A SPLINE JOINT

(75) Inventors: David R. Hinton, Mt. Zion, IL (US); Michael A. Lopez, Urbana, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/902,323

(22) Filed: Jul. 10, 2001

(65) Prior Publication Data

US 2003/0010578 A1 Jan. 16, 2003

(51) Int. Cl.⁷ .............................................. F16D 55/36
(52) U.S. Cl. .................. 188/71.5; 188/18 A; 188/72.4; 188/106 A; 188/114
(58) Field of Search ............................ 188/18 A, 71.4, 188/71.5, 72.4, 106 A, 114; 301/6.1, 6.8, 111.02, 131, 6.7, 6.6

(56) References Cited

U.S. PATENT DOCUMENTS

| | | | | |
|---|---|---|---|---|
| 1,977,981 A | | 10/1934 | Bates | |
| 1,982,617 A | | 11/1934 | Wolff | |
| 2,020,667 A | * | 11/1935 | Wahl | 188/71.5 |
| 2,070,289 A | | 2/1937 | Marmon et al. | |
| 2,114,937 A | | 4/1938 | Poirier | |
| 2,127,725 A | | 8/1938 | Frank | |
| 2,351,180 A | | 6/1944 | Ash | |
| 2,370,097 A | | 2/1945 | Weiss | |
| 2,386,477 A | | 10/1945 | Kraft | |
| 2,671,532 A | | 3/1954 | Du Bois | |
| 2,916,105 A | | 12/1959 | Dasse et al. | |
| 2,928,504 A | * | 3/1960 | Hahn et al. | 188/71.5 |
| 2,962,324 A | | 11/1960 | Swanberg | |
| 3,486,588 A | * | 12/1969 | Grego | 188/74.5 |
| 3,602,339 A | | 8/1971 | Sontheimer | |
| 4,037,694 A | * | 7/1977 | Keese | 180/370 |
| 4,082,363 A | | 4/1978 | Goodbary | |
| 4,173,269 A | * | 11/1979 | Craig | 188/218 XL |
| 4,207,968 A | * | 6/1980 | Chamberlain | 188/369 |
| 4,576,255 A | * | 3/1986 | Mery et al. | 188/71.5 |
| 4,585,096 A | * | 4/1986 | Bok | 188/71.5 |
| 4,605,103 A | * | 8/1986 | Carre et al. | 188/218 XL |
| 4,878,563 A | * | 11/1989 | Baden et al. | 188/251 A |
| 4,890,699 A | * | 1/1990 | Megginson et al. | 188/18 A |
| 4,944,370 A | * | 7/1990 | Chambers et al. | 188/264 G |
| 5,174,420 A | * | 12/1992 | DeWald et al. | 188/170 |
| 5,307,906 A | * | 5/1994 | Jamzadeh et al. | 188/106 F |
| 5,333,705 A | * | 8/1994 | Lemaire et al. | 188/170 |
| 5,348,122 A | | 9/1994 | Brundrett | |
| 5,368,137 A | * | 11/1994 | Clemens | 188/346 |
| 5,494,138 A | * | 2/1996 | Scelsi et al. | 188/18 A |
| 5,701,976 A | * | 12/1997 | Kumagai et al. | 188/71.5 |
| 5,893,445 A | * | 4/1999 | Dover | 188/71.5 |
| 5,944,147 A | * | 8/1999 | Berwanger | 188/71.5 |
| 5,988,613 A | | 11/1999 | Dagh et al. | |
| 6,090,006 A | * | 7/2000 | Kingston | 180/372 |
| 6,145,635 A | * | 11/2000 | White | 188/170 |
| 6,293,890 B1 | * | 9/2001 | Kaku | 188/71.5 |
| 6,357,558 B1 | * | 3/2002 | Case et al. | 188/170 |
| 6,405,835 B1 | * | 6/2002 | Satou et al. | 188/170 |

\* cited by examiner

*Primary Examiner*—Christopher P. Schwartz
*Assistant Examiner*—Devon Kramer
(74) *Attorney, Agent, or Firm*—Sughrue Mion Zinn Macpeak; Thomas L Derry (57) ABSTRACT

A brake assembly for braking a wheel having a brake anchor, a brake anchor first annular portion, a brake anchor second annular portion, and a plurality of brake anchor splines on the brake anchor first annular portion.

35 Claims, 9 Drawing Sheets

OFF HIGHWAY TRUCK BRAKE ASSEMBLY AND WHEEL SPINDLE HAVING A SPLINE JOINT

TECHNICAL FIELD

This invention relates to a brake assembly for an off-highway truck, such as earthmoving trucks or the like, and, more particularly, a wet brake assembly joined to a wheel spindle by a mechanical spline joint.

BACKGROUND

Large off-highway trucks, such as earthmoving trucks having 240 ton hauling capacity, typically have at least a pair of wheels that are rotatably mounted on corresponding wheel axles or wheel spindles. These trucks use multiple disc brake assemblies for braking. These multiple disc brake assemblies include a plurality of rotatable and complementary non-rotatable discs that contact each other when the truck is braked to overcome the truck's high momentum forces and stop or reduce the truck's speed. Given the large size of the off-highway truck, and associated wheels that can have approximately 12 foot diameter tires, the brake assemblies experience very high loads and generate a great amount of heat during braking. Therefore, wet brake assemblies are typically used that are cooled by a fluid such as oil or other common fluid.

Known multiple disc brake assemblies include a brake anchor that is axially mounted on the wheel spindle and secured to a brake anchor flange that is integral with the wheel spindle at an inboard end of the wheel spindle. A large number of retention bolts are passed through the brake anchor flange and into the back of the brake anchor to form a mechanical bolted joint between the brake anchor and the brake anchor flange so that these two components are coupled in a non-rotatable manner. Upon braking, the mechanical bolted joint is subjected to high shearing forces that may cause undue shear stresses. In order to withstand these high shearing forces, the mechanical bolted joint must have a high shearing capacity. To achieve this, the brake anchor flange has a relatively large surface area where it couples with the back (i.e., inboard side) of the brake anchor, and the retention bolts are accurately tightened with a predetermined torque to create a high normal reaction force between the brake anchor flange and the abutting face of the brake anchor. The friction between the large surface area of the brake anchor flange the abutting face of the brake anchor, together with the normal load therebetween, determine the total shearing capacity of the mechanical joint.

The requirement for the brake anchor flange to have a large surface area to achieve the desired shearing capacity results in a large diameter flange that is relatively thin, making the spindle difficult to manufacture. In particular, if the spindle is cast, maintaining the flat shape of the brake anchor flange during casting and subsequent cooling is very difficult, given the brake anchor flange's relatively large diameter. On the other hand, forging is difficult due to the large increase in the spindle cross-section at the large diameter flange.

Additionally, the large diameter of the brake anchor flange makes it susceptible to standing waves that can develop due to shocks received during operation of the truck by the wheel that are then transmitted through the spindle to the brake assembly. These standing waves cause excessive noise and vibration in the spindle and brake assemblies.

The large number of retention bolts required to create the necessary normal reaction force between the brake anchor and the brake anchor flange requires the bolts to be interspersed between components of the brake assembly, such as springs for the parking brake, and hydraulic ports in the brake anchor so as not to interfere with these components and ports. However, the available space for interspersing these retention bolts is limited, making it difficult to accommodate all the retention bolts. Accordingly, the brake anchor is typically increased in width to accommodate the length of the retention bolts without interfering with other parts of the brake anchor. Moreover, given that each of the retention bolts must be accurately tightened to create the necessary normal reaction force, sufficient clearance must be left on the back side of the brake anchor flange to allow a technician access to the retention bolts to carry out this labor intensive activity. Additionally, if the technician fails to accurately tighten the retention bolts, the shearing capacity of the mechanical joint may not withstand the operational shearing loads.

The multiple disc brake assemblies of off-highway trucks generate a relatively large amount of heat when braking. Hence, a number of off-highway trucks have heretofore been designed with fluid-cooled or wet brake systems. Such wet brake systems circulate lubricating oil around the discs of the disc brake assemblies, thereby cooling the discs during operation of the off-highway truck. However, there remains a need to increase the brake capacity, which can be achieved in three principle ways, namely, increasing the diameter of the brake discs, by increasing the number of these discs, and increasing the brake application force. Current design constraints limit the availability of these alternatives. One such constraint is the limited available space. In particular, increasing the brake size to allow for more brake discs reduces the spread between the two sets of wheel roller bearings required for rotatably mounting the wheel to the spindle.

The present invention is directed to overcoming one or more of the problems described above.

SUMMARY OF THE INVENTION

According to one aspect of the present invention, a brake assembly for braking a wheel is provided, having a brake anchor including a brake anchor first annular portion, a brake anchor second annular portion, a plurality of brake anchor splines on the brake anchor first annular portion.

According to another aspect of the present invention, a wheel spindle is provided for mounting a wheel and brake assembly, having a roller bearing assembly for rotatably supporting a wheel and a large diameter portion inboard of the roller bearing assembly having a plurality of wheel spindle splines on an outside circumferential surface of the large diameter portion.

According to yet another aspect of the present invention, a combination brake and wheel spindle is provided, having a wheel spindle, including a large diameter portion having a plurality of wheel spindle splines on an outside circumferential surface of the large diameter portion; and a brake assembly. The brake assembly includes a brake anchor, a brake anchor inboard annular portion on an inboard side of the brake anchor, a brake anchor outboard annular portion on an outboard side of the brake anchor, and a plurality of brake anchor splines on the brake anchor inboard annular portion. The brake assembly is axially mounted on the wheel spindle, and the plurality of wheel spindle splines are meshed with the plurality of brake anchor splines to form a mechanical spline joint so that the brake anchor is non-rotatably coupled to the wheel spindle.

BRIEF DESCRIPTION OF THE DRAWINGS

The above-mentioned and other features and advantages of this invention are described below with reference to the accompanying drawings, wherein:

FIG. 8 is a perspective view of the wheel spindle mounted to a steering arm in accordance with the present invention.

DETAILED DESCRIPTION

While the invention is open to various modifications and alternative forms, a specific embodiment thereof has been shown by way of example in the drawings and will herein be described in detail. There is no intent to limit the invention to the particular form disclosed.

FIGS. 1–7 show a brake assembly 101 non-rotatably mounted on a wheel spindle 201, and a wheel 301 rotatably mounted on the wheel spindle 201. Throughout the following detailed description of the invention, "inboard" refers to the side or end closest to a longitudinal vertical center plane of the truck, and "outboard" refers to the side or end furthest from the longitudinal vertical center plane of the truck.

The brake assembly 101, shown here as a wet brake assembly, includes a multiple disc brake pack 102 (shown in FIGS. 4 and 5), a non-rotatable member or brake anchor 103, and a rotatable member 302. The multiple disc brake pack 102 has a plurality of non-rotatable brake discs 104, and a plurality of cooperating rotatable brake discs 106. The non-rotatable brake discs 104 are connected to the brake anchor 103, for example by meshing teeth (not shown) on the outer diameter side of each of the non-rotatable brake discs 104 with corresponding teeth 106 on an inside circumferential surface 107 of a brake anchor outboard annular portion 108 of the brake anchor. The rotatable brake discs 105 are connected to the rotatable member 302, which is an inboard annular portion of the wheel, by meshing teeth (not shown) on the inside diameter side of each of the rotatable brake discs 105 with corresponding teeth 303 on an outside circumferential surface 304 of a wheel inboard annular portion 302 of the wheel 301.

The brake anchor 103 defines a plurality of fluid passages 109 for supplying hydraulic fluid to the various components of the wet brake assembly 101 and dumping hydraulic fluid from the wet brake assembly 101.

Figure 2:
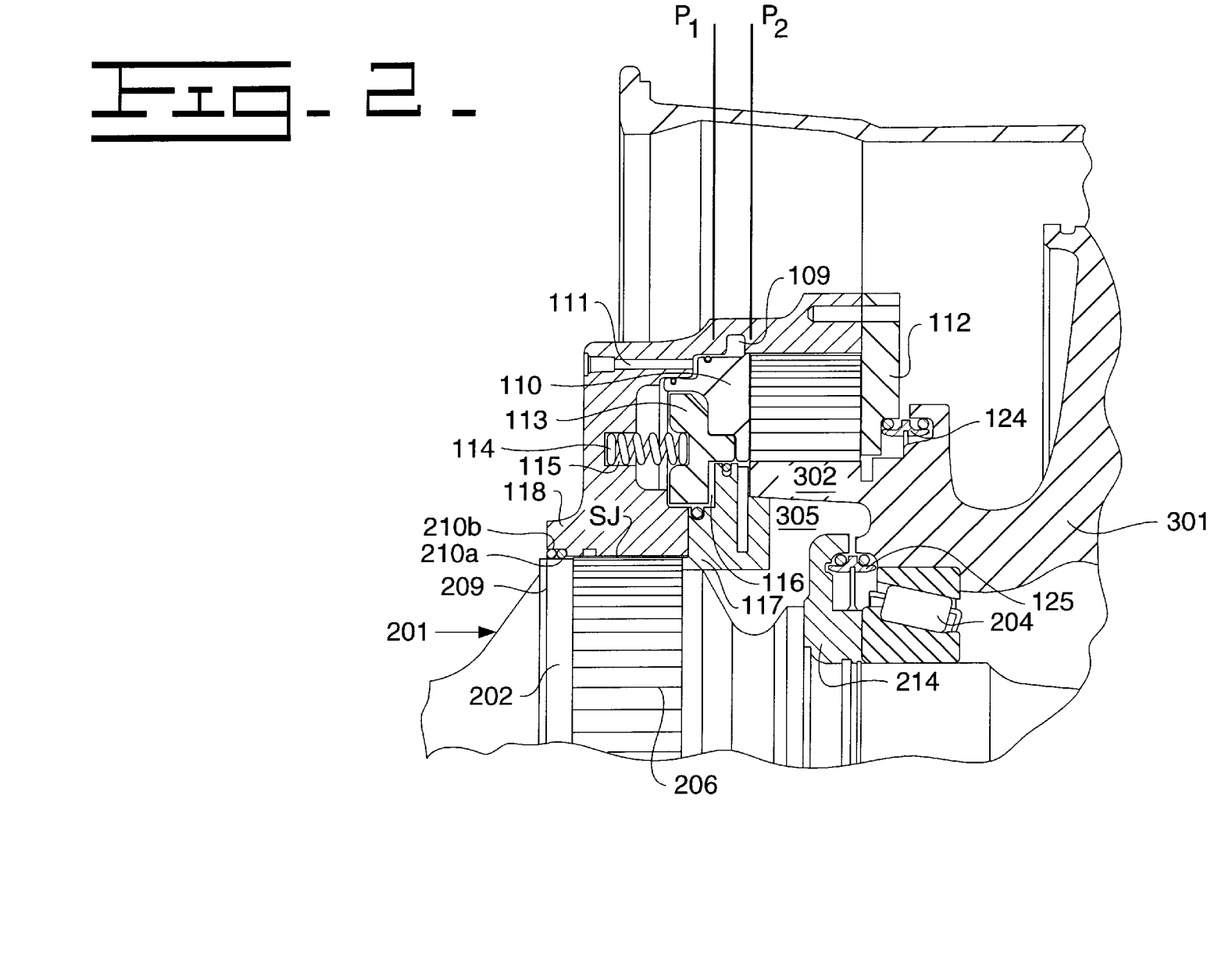
FIG. 2 is a partial cross-sectional side view of a portion of the wheel spindle and brake assembly having a wheel mounted thereon in accordance with the present invention.

As shown in FIG. 2, a main brake piston 110 is positioned within the brake anchor 103 and is operable to move between a first position P1 and a second position P2 axially offset from the first position P1 using hydraulic pressure supplied through a port 111. The first position P1 corresponds to when the brakes are not applied. In this first position, the main brake piston 110 is not pressed against the disc brake pack 102 so that the non-rotatable brake discs 104 are spaced from the rotatable brake discs 105 and so that there is little to no resistance against the rotation of the rotatable brake discs 105 and rotatable member 104. The second position P2 corresponds to when the brakes are applied. In this second position, the main brake piston 110 is pressed against the disc brake pack 102 so that the non-rotatable brake discs 104 are pressed against the rotatable discs 106, thereby creating frictional resistance against the rotation of the rotatable brake discs 105 and rotatable member 104. The disc brake pack 102 is prevented from moving axially in the outboard direction by a brake anchor reaction plate 112.

A parking brake piston 113 is disposed inboard of the main brake piston 108, and is biased in the outboard direction by a plurality of parking brake piston springs 114 seated in spring pockets 115, so that when the brake oil pressure is reduced, for example, when the truck is turned off, the parking brake piston 113 presses the multiple disc brake pack 102 via the main brake piston 110 to engage the parking brake. In order to release the parking brake, oil pressure is built up in a gap 116 on the outboard side of the parking brake piston 113 to move this piston in the inboard direction, thereby releasing the multiple disc brake pack 102. The gap 116 is defined by the parking brake piston 113 and a parking brake housing 117 disposed on the outboard side of the parking brake piston 113.

Additionally, the parking brake piston 113 may be coupled, for example, with a weak spring (not shown), to the main brake piston 108, so that when oil pressure is built up in the gap 116 on the outboard side of the parking brake piston 113 to move the parking brake piston 113 in the inboard direction, the parking brake piston 113 pulls the main brake piston 110 with it. This ensures that the main brake piston 110 is not normally pressed against the multiple disc brake pack 102 during operation of the truck.

The brake anchor 103 is axially mounted on the wheel spindle 201 so as to be non-rotatable with respect to the wheel spindle. In particular, the brake anchor has a brake anchor inboard annular portion 118 at one end of the brake anchor with a series of parallel splines 119 axially arranged on an inside circumferential surface 120 of the annular portion, and preferably evenly distributed about the inside circumferential surface of the annular portion.

The wheel spindle 201 has a large diameter portion 202 with an outside circumferential surface 203 disposed on an inboard side of wheel roller bearing assemblies 204 and 205. The large diameter portion 202 of the wheel spindle has a series of parallel splines 206 along the outside circumferential surface 203 that correspond to the splines 119 of the brake anchor 103.

Accordingly, when the splines 119 of brake anchor 103 are meshed with the splines 206 of the wheel spindle 201 by axially sliding the brake anchor inboard annular portion 118 over the large diameter portion 202, a mechanical spline joint SJ is formed between the brake anchor 103 and the wheel spindle 201 that prevents relative rotation between these two components. Given the large loads applied to the spline joint SJ, the large diameter portion 202 preferably has a diameter that is larger than at least a diameter of the wheel spindle 201 where the smallest roller bearing assembly 205 is mounted on the wheel spindle 201.

Figure 6A:
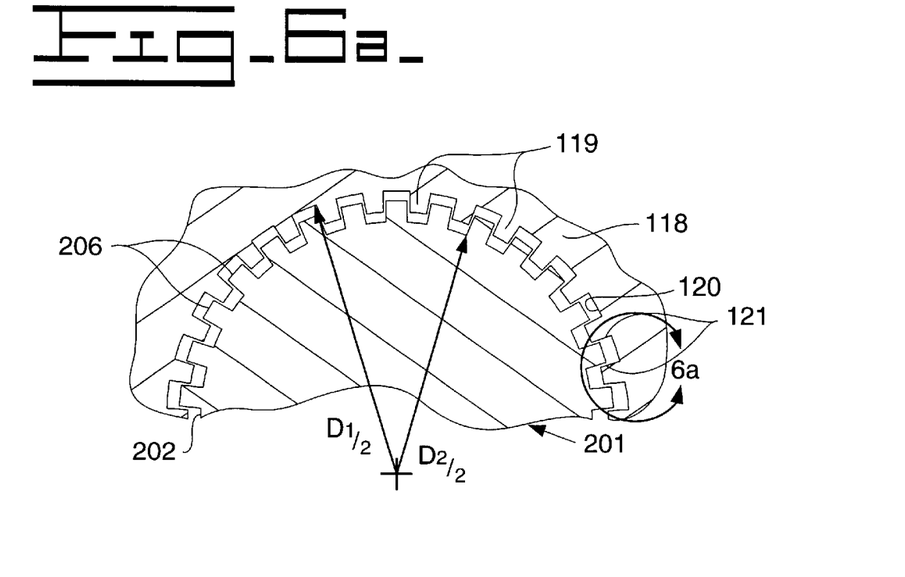
FIG. 6 is an axial cross-sectional view of a portion of the mechanical spline joint in accordance with the present invention.
Figure 6B:
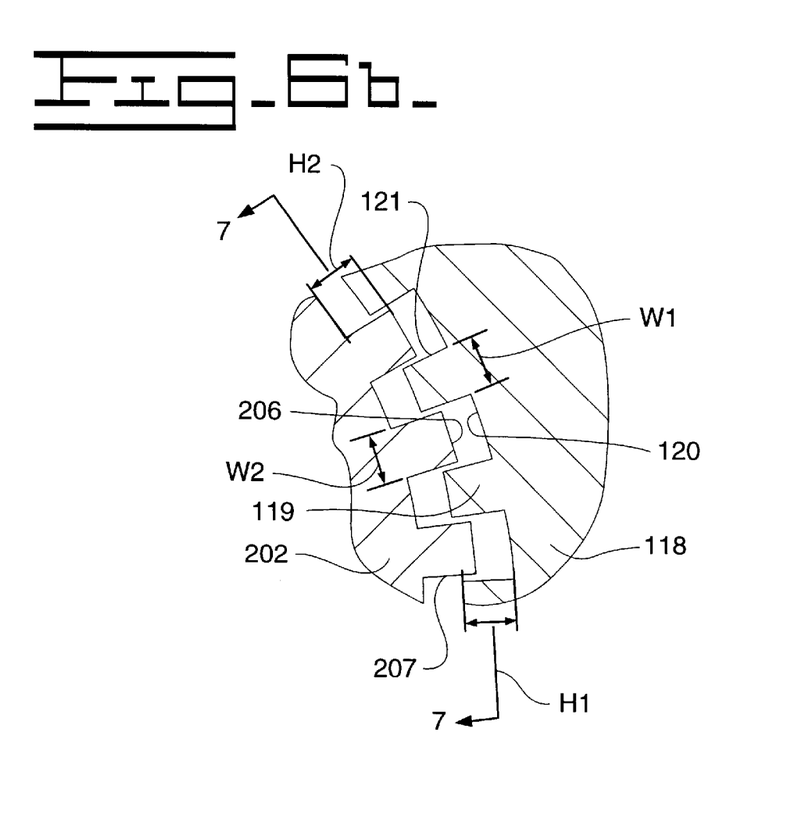

Referring to FIG. 6, to facilitate mounting and removing the brake anchor 103 on and from the wheel spindle 201, it is preferable to size the diameter D1 of the inside circumferential surface 120 to be sufficiently larger than the outer diameter D2 of the outside circumferential surface 203 as to avoid an interference fit between the brake anchor 103 and the wheel spindle 201. On the other hand, the diameter D1 should be sufficiently small to ensure adequate surface area contact between abutting faces 121, 207 of the brake anchor splines 119 and the wheel spindle splines 206. Similarly, the height H1 of the brake anchor splines 119 and the height H2 of the wheel spindle splines 206 should also be relatively sized so as to ensure adequate surface area contact between the respective abutting faces 121, 207. Additionally, the width W1 of the brake anchor splines 119 and the width W2 of the wheel spindle splines 206 should be relatively sized so as to facilitate mounting and removing the brake anchor 103 on and from the wheel spindle 201, and the flow of oil between the mechanical spline joint SJ, while preventing excessive play between these two components.

Figure 7:
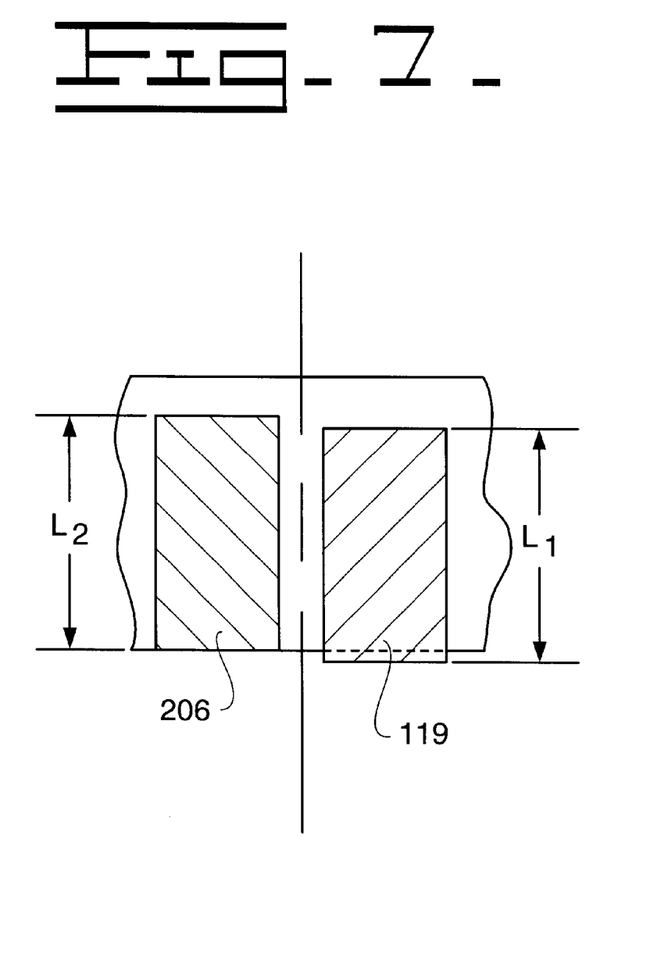
FIG. 7 is a top cross-sectional view of a portion of the mechanical spline joint in accordance with the present invention.

Referring to FIG. 7, the length L1 of the brake anchor splines 119 and the length L2 of the wheel spindle splines 206 should be sized to ensure adequate strength to maintain the mechanical joint in its operating environment.

Therefore, when designing the mechanical spline joint SJ, the respective diameters of the brake anchor inboard annular portion 118 and large diameter portion 202, and the respective heights, widths, and lengths of the individual splines 119, 206 must be properly sized to facilitate the mounting and removing of the brake anchor 103 on and from the wheel spindle 201, while ensuring adequate strength of the mechanical spline joint SJ.

In order to dissipate the tremendous amount of heat generated when the non-rotatable brake discs 104 and the rotatable bake discs 105 are pressed against each other during braking, oil is passed through and around the multiple disc brake pack 102. As described above, the wheel 301 has an inboard annular portion 302, which is preferably formed as a one-piece integral construction with the wheel 301. This one-piece construction provides additional room in both the radial and axial directions of the wet brake assembly 101 and wheel 301, thereby allowing more brake discs 104, 105 to be used in the multiple disc brake pack 102, and increased oil flow through and around the multiple disc brake pack 102.

In particular, the increased oil flow can be achieved by undercutting a region 305 below the teeth 303 on the inboard annular portion 302 of the wheel 301 to allow oil to fill this region. Holes can then be made through the inboard annular portion 302 to allow oil to flow radially outwards through and around the multiple disc brake pack 102 before being dumped back through the pistons 110, 113 on the inboard side of the brake anchor 103.

Preferably, however, in order to avoid making holes through the inboard annular portion 302, the oil can flow through a conduit 122 formed near an outer periphery of the brake anchor 103 and radially inwards through and around the multiple disc brake pack 102. The oil then flows into the roots of the teeth 303 on the inboard annular portion 302 of the wheel 301 and runs down to the end of the teeth 303 before dumping into the region 305.

A split ring 208 is bolted to an inboard face 209 of the large diameter portion 202 of the wheel spindle 201. The split ring 208 preferably includes two C-sections that are positioned around the wheel spindle 201 and abut the inboard end of the brake anchor 103. One or more seals 210a, 210b, such as O-ring seals, are placed around the large diameter portion 202 of wheel spindle 201 between the inboard side of the wheel spindle splines 206 and the outboard side of the split ring 208, thereby creating a radial seal between the wheel spindle 201 and the brake anchor 103 near the inboard end of the brake anchor 103. The radial seals 210a, 210b allow the flow of oil to pass from the region 305 between the mechanical spline joint SJ, but stop the flow of oil from flowing off the inboard side of the wheel spindle. By allowing the oil to flow between the mechanical spline joint SJ, the amount of wear that results from the play between the meshed splines 119, 206 can be reduced. Additionally, the flow of oil between the mechanical spline joint SJ lubricates and cleans this joint.

Referring to FIG. 2, in the case where two seals 210a, 210b are used, the outboard seal 210a functions primarily to stop the flow of oil, while the inboard seal 210b acts as a spacer to press the outboard seal 210a axially in the outboard direction. Accordingly, when the outboard seal 210a wears, it can be switched with the inboard seal 210b by passing one over the other without requiring the removal of the wet brake assembly 101 or the wheel spindle 201.

Figure 3:
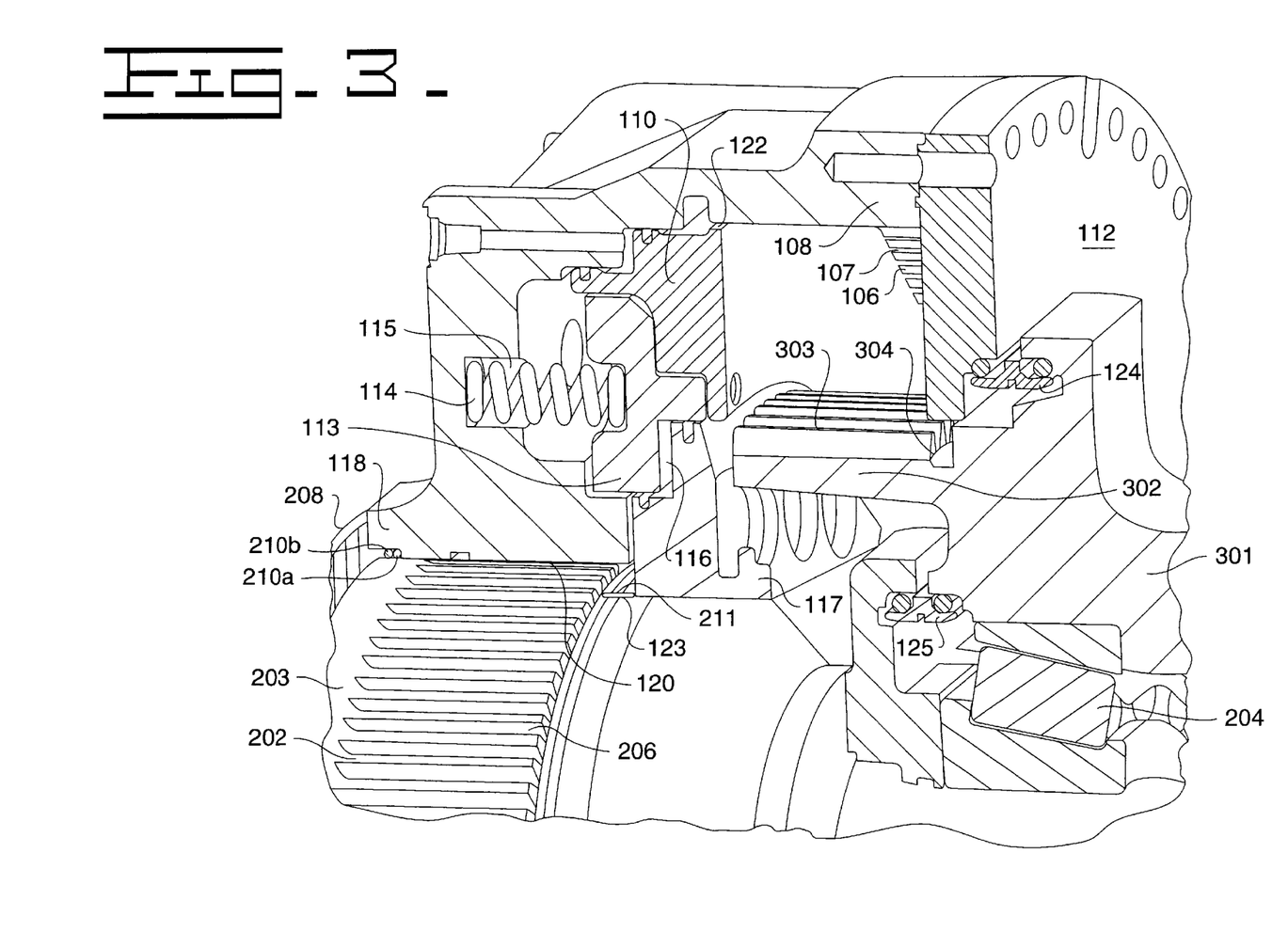
FIG. 3 is a partial perspective view of a portion of the wheel spindle and brake assembly having a wheel mounted thereon in accordance with the present invention.
Figure 4:
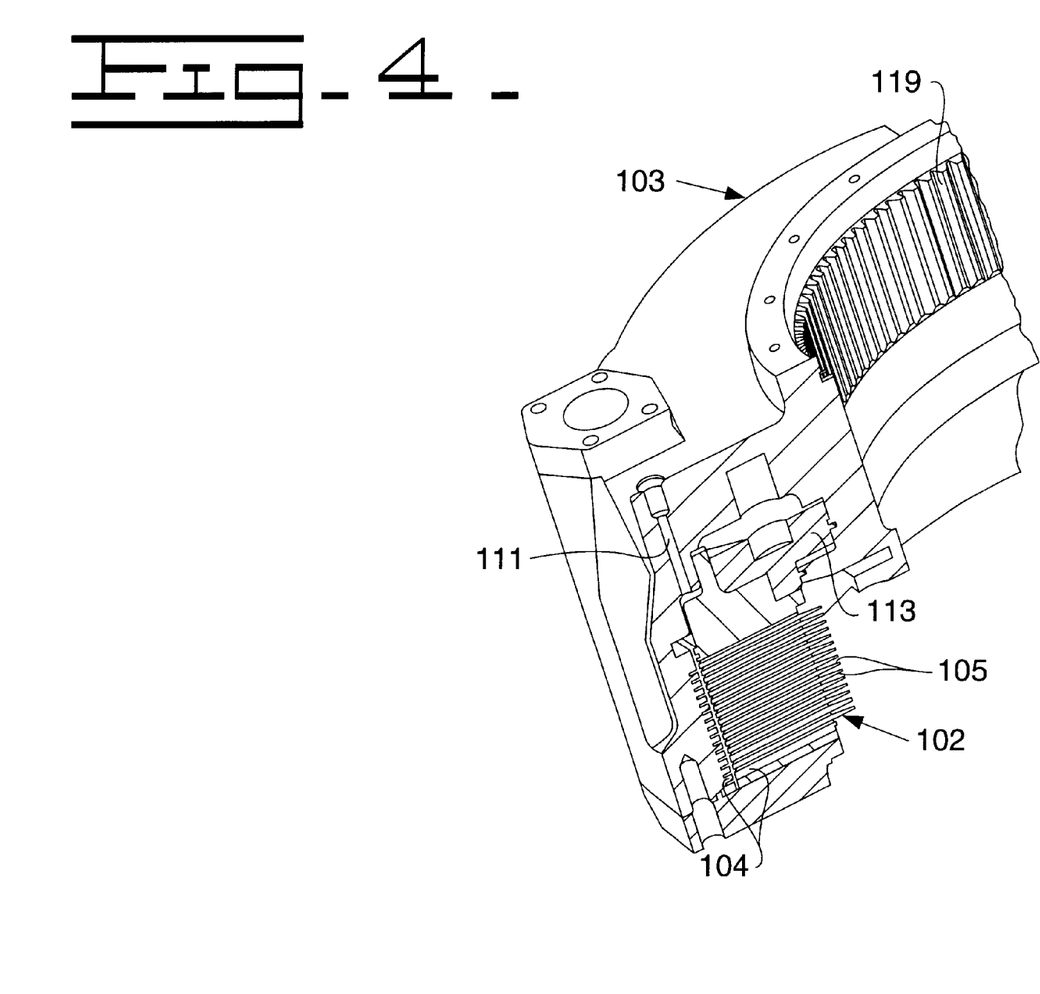
FIG. 4 is a perspective cross-sectional view of a portion of the brake assembly showing the multiple brake disc pack in accordance with the present invention.
Figure 5:
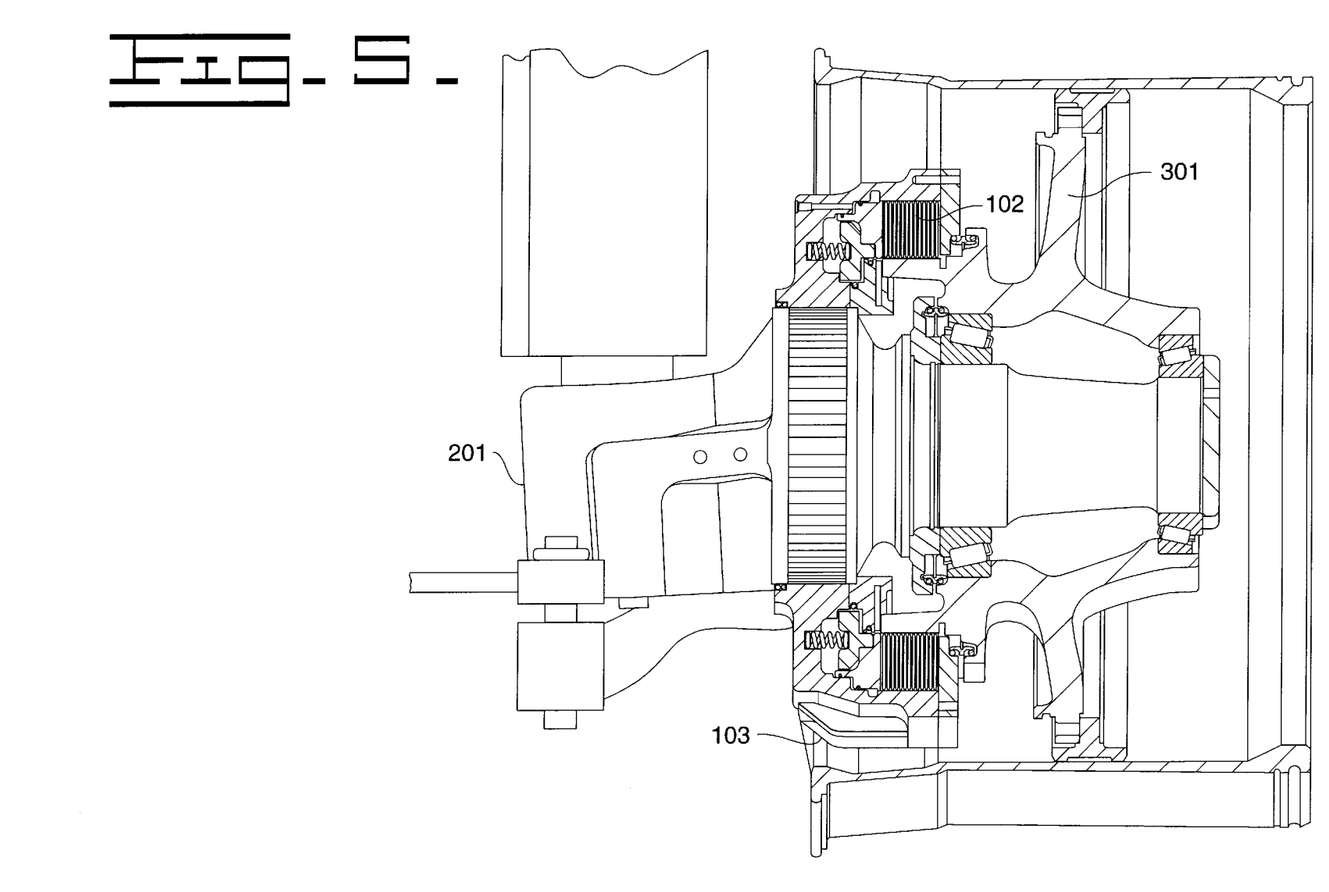
FIG. 5 is a perspective view of a portion of the wheel spindle and brake assembly mounted to a steering arm in accordance with the present invention.

In addition to defining the gap 116, the a parking brake housing 117 also serves as a stop that prevents the wet brake assembly 101 from sliding too far in the inboard direction. Specifically, as best shown in FIG. 3, the parking brake housing 117 abuts against an outboard side of the large diameter portion 202. Furthermore, in order to ensure proper rotational alignment between the wet brake anchor assembly 101 and the wheel spindle 201, holes 123 are formed in the wet brake assembly 101, for example, in the parking brake housing 117 as shown in FIG. 3. Corresponding pins 211 are formed on the abutting portion of the wheel spindle 201. Accordingly, the wet brake assembly 101 cannot be fully slid on the wheel spindle 201 in the inboard direction unless the pins 211 and holes 123 are aligned. While not shown, the holes may be formed in the wet brake assembly 101, and the pins may be formed on the abutting portion of the wheel spindle 201.

On the outboard end of the wet brake assembly 201, an outer seal 124, for example a Duo-Cone seal, is positioned between the brake anchor 201 and the wheel 301 to prevent oil from leaking out between these two parts. Similarly, an inner seal 125, which can also be a Duo-Cone seal, is positioned between the wheel 301 and a retainer 214 to prevent oil from leaking to the roller bearings 204, 205.

Figure 1:
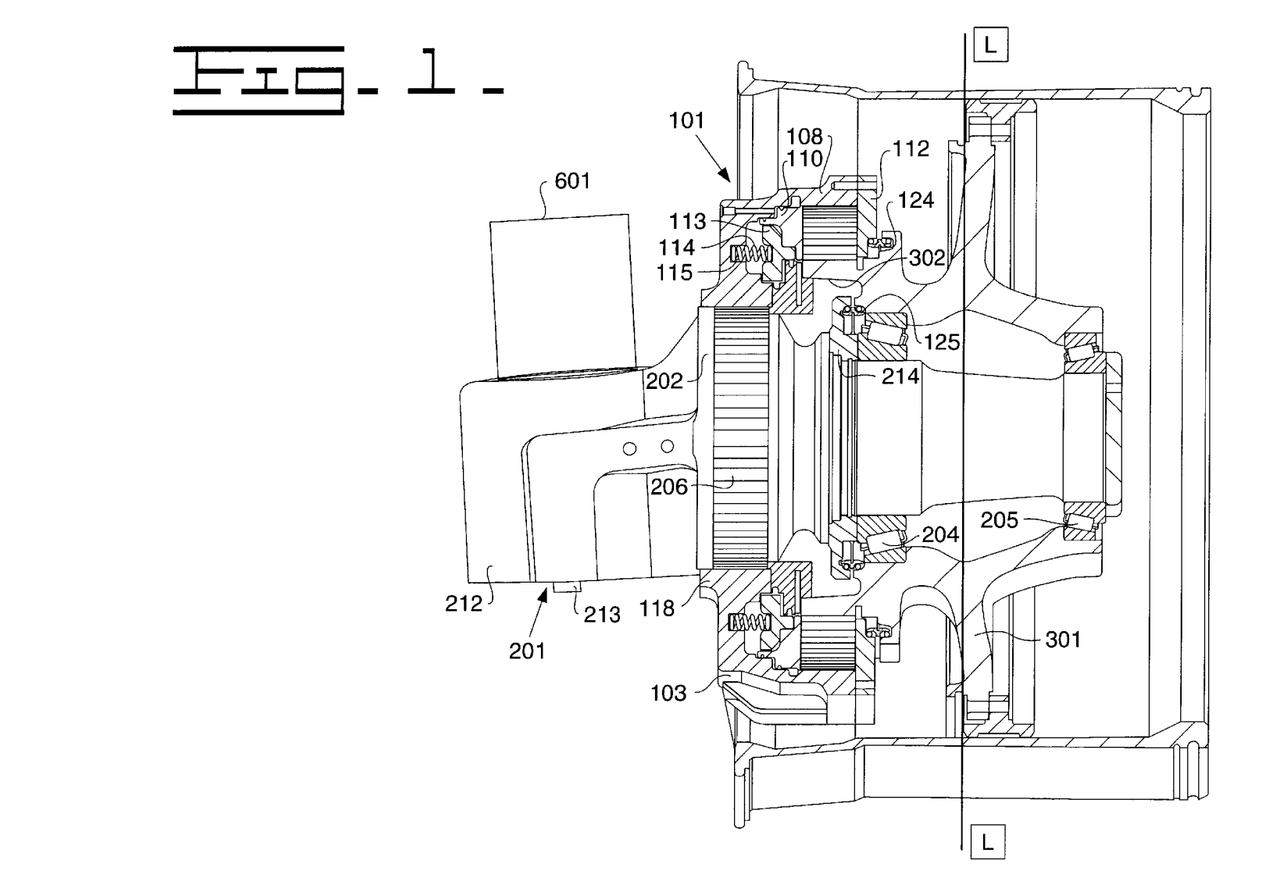
FIG. 1 is a partial cross-sectional side view of a wheel spindle and brake assembly having a wheel mounted thereon in accordance with the present invention.

As shown in FIGS. 1 and 8, the wheel spindle 201 has a steering arm mounting member 212 on the inboard side of the wheel spindle below the strut housing 601, and that includes a key 213 protruding downwardly from the steering arm mounting member 212. Accordingly, the wheel spindle 201 is bottom mounted by mounting a steering arm platform 501 to the bottom of the steering arm mounting member 212, with the key 213 fitted in a corresponding key hole 502 formed in the top of the steering arm 501 platform. Several bolts 503 are then used to fastened the steering arm 501 to the steering arm mounting member 212. The key 213 acts as a safety feature to prevent the bolts 503 from being subjected to excess shearing forces. Among other advantages, by bottom mounting the wheel spindle 201, the steering arm mounting member 212 can be made circular making it easy to forge.

Figure 9:
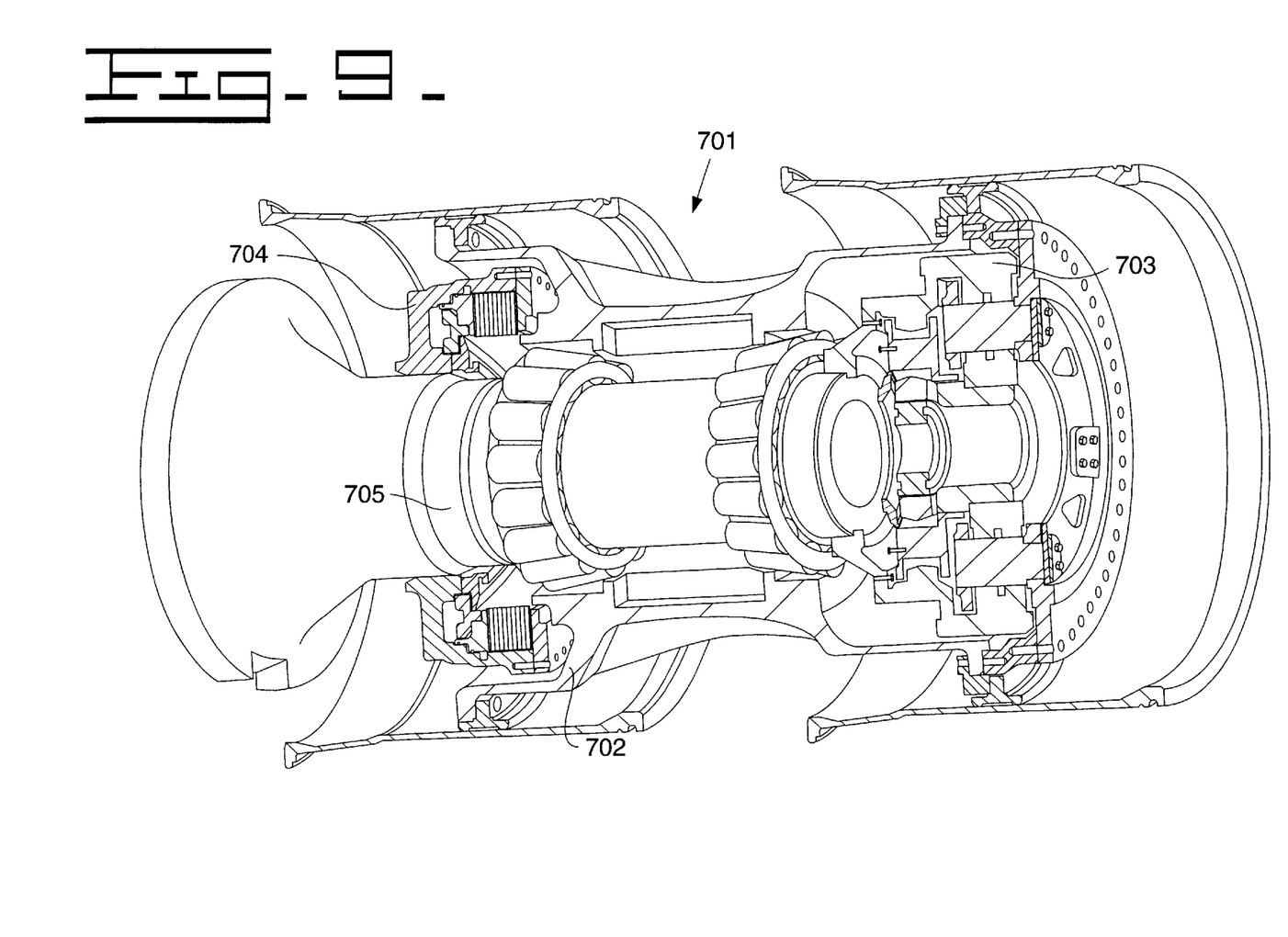
FIG. 9 is a partial cross-sectional side view of a brake assembly for a driven wheel in accordance with the present invention.
Figure 11:
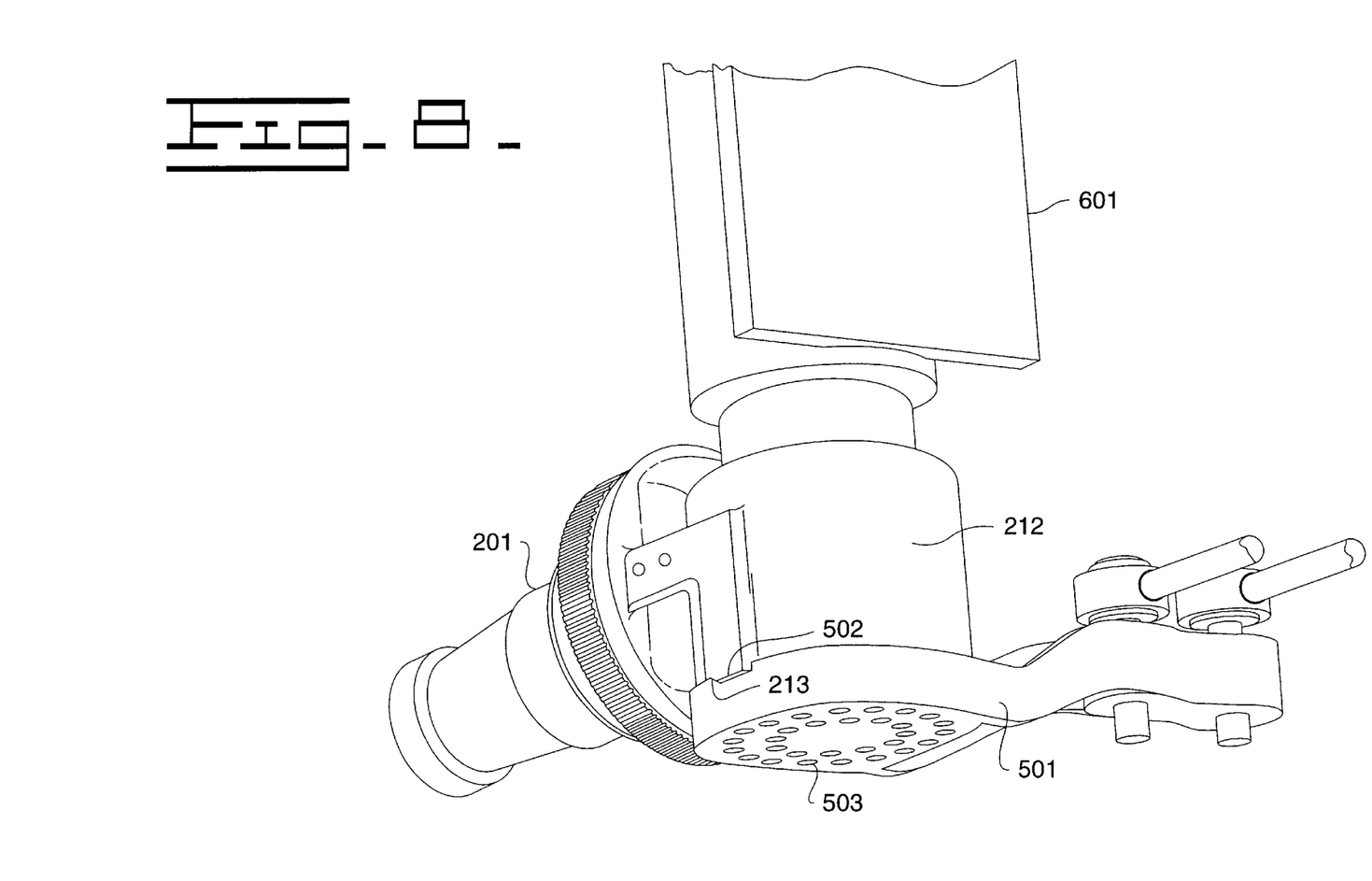

While the foregoing describes the present invention with respect to a non-driven wheel, the present invention is not limited in this way. For example, as shown in FIG. 9, the present invention can be used in a wheel station 701 for a driven wheel 702 that is driven via a reduction gear assembly 703. The present invention can also be used with a wheel that is directly driven with a straight drive axle such as those in automotive designs. For simplicity, the splines on the wet brake assembly 704 for the wheel station 701 and the splines for the large diameter portion 705 of the spindle for wheel station 701 are not shown.

Industrial Applicability

The wet brake assembly 101, including the brake anchor 103, the main brake piston 108, the parking brake piston 113, the parking brake piston springs 114, the multiple disc brake pack 102, the parking brake housing 117, and the brake anchor reaction plate 112, is mounted onto the wheel spindle 201 by sliding it over the wheel spindle 201 so that the brake anchor splines 119 pass between the wheel spindle splines 206 and form the spline joint SJ. Preferably, when performing this operation, the wheel spindle 201 is positioned vertically on its inboard end.

Once the wet brake assembly 101 is mounted on the wheel spindle so that the brake anchor splines 119 fully engage the wheel spindle splines 206, the O-ring seal 210 is placed around the large diameter portion 202 of wheel spindle between the inboard side of the wheel spindle splines 206 and the outboard side of the split ring 208. The split ring 208 is then bolted to the inboard face 209 of the large diameter portion 202 of the wheel spindle 201. Replacement of the O-ring 210 is made relatively simple, since the split ring 208 can be easily removed without removing the wet brake assembly 101 from the wheel spindle 201. If the wet brake assembly 101 is inadvertently mounted onto the spindle 201 without the parking brake housing 117, the spindle splines 206, which preferably do not extend the entire length of the large diameter portion 202 in the inboard direction, interfere with the brake anchor splines 119 to prevent the wet brake assembly from moving further inboard.

After the wet brake assembly 101 is mounted on the wheel spindle 201, the wheel 301 is mounted onto the spindle with the inner and outer Duo-Cone seals 124, 125, which prevent the brake assembly 101 from sliding off the outboard end of the wheel spindle 201. When the wheel 301 is not mounted, the split ring 208 will prevent the wet brake assembly 101 from sliding off the outboard side of the wheel spindle 201.

An advantageous effect of a wet brake assembly according to the present invention that uses a spline joint SJ to rotationally fix the brake anchor 103 to the wheel spindle 201 is the positioning of the wet brake assembly 101 further inboard as compared with conventional brake assemblies that use a brake anchor flange to rotationally fix the brake anchor to the wheel spindle. In particular, the spline joint SJ does not require a large number of retention bolts to mount the brake anchor to a brake anchor flange, allowing the tool clearance between the strut and the inboard side of the brake anchor to be reduced. Additionally, the elimination of the brake anchor flange and retention bolts further eliminates the need for additional space to avoid having the retention bolts interfere with various parts of the brake anchor such as the spring pockets. Accordingly, added space is created for increasing the number of brake discs and improving the flow of oil through the brake anchor.

Moreover, the added space allows the spread between the inboard and outboard roller bearings 204, 205 to be increased, thereby improving the load distribution on the wheel spindle 201. In particular, the inboard roller bears 204 can be moved further inboard away from the outboard roller bearings 205, so that a load center line L for the wheel 201, which represents the center line for the vertical load passing through the tire mounted on the wheel, passes near or through a center position between the two bearings 204, 205 and reduces the moment loads on the inboard roller bearings 204.

The added space further allows for additional brake discs 104, 105, thereby increasing the overall brake capacity, while reducing the heat generated in any one disc.

Another advantageous effect of the present invention is that the wheel spindle 201 no longer requires a large thin flange portion. Therefore, the wheel spindle 201 can be forged to produced a higher quality spindle.

Yet another advantageous effect of the present invention is that the non-rotational spline joint SJ between the brake anchor 103 and the wheel spindle 201 does not require a technician to accurately torque the retention bolts to ensure the adequate shearing capacity of the mechanical joint. Therefore, the serviceability of the joint is greatly improved.

In view of the foregoing, it is readily apparent that the subject wet brake assembly provides an improved mechanism for retaining the wet brake assembly to the wheel spindle.

Other aspects, objects and advantages of the present invention can be obtained from a study of the drawings, the disclosure and the appended claims.

What is claimed is:

1. A wet brake assembly for braking a wheel, comprising:
    a brake anchor, including:
        a brake anchor annular portion,
        a brake anchor second annular portion, and
        a plurality of brake anchor splines on the brake anchor first annular portion, said splines being oriented in an axial direction.

2. The wet brake assembly according to claim 1, including a multiple disc brake pack having a plurality of brake discs, the multiple disc brake pack coupled to the second annular portion,
    a main brake piston housed in the brake anchor intermediate to the brake anchor first annular portion and the brake anchor second annular portion, and
    a port for supplying a cooling fluid to the multiple disc brake pack.

3. The wet brake assembly according to claim 2, wherein the brake anchor first annular portion is a brake anchor inboard annular portion on an inboard side of the brake anchor, and the brake anchor second annular portion is a brake anchor outboard annular portion on an outboard side of the brake anchor.

4. The wet brake assembly according to claim 1, wherein the plurality of brake anchor splines on the brake anchor inboard annular portion are disposed on an inside circumferential surface of the brake anchor inboard annular portion.

5. The wet brake assembly according to claim 4 wherein the plurality of brake anchor splines on the brake anchor inboard annular portion substantially span an entire inside circumference of the brake anchor inboard annular portion.

6. The wet brake assembly according to claim 3 wherein the multiple disc brake pack has non-rotatable brake discs fixed to the brake anchor outboard annular portion, and the brake anchor outboard annular portion has a plurality of teeth on a circumferential surface of the brake anchor outboard annular portion, and wherein the non-rotatable brake discs are fixed to the plurality teeth on the circumferential surface of the brake anchor outboard annular portion.

7. The wet brake assembly according to claim 3, including a brake anchor reaction plate disposed on an outboard side of the multiple disc brake pack that opposes a force on the multiple disc brake pack when the main piston is urged against the multiple disc brake pack during braking.

8. The wet brake assembly according to claim 3, including a rotatable member rotatable with respect to the brake anchor, the rotatable member having an annular portion that opposes the brake anchor outboard annular portion, and wherein the multiple disc brake pack is disposed between the brake anchor outboard annular portion and the rotatable member, and wherein the multiple disc brake pack has rotatable brake discs fixed to the rotatable member.

9. The wet brake assembly according to claim 8, wherein the rotatable member portion is a one-piece integral construction with the wheel.

10. A wheel spindle assembly for mounting a wheel and brake assembly, comprising a large diameter portion having a plurality of wheel spindle splines, said splines being oriented in an axial direction, on an outside circumferential surface of the large diameter portion for coupling with the brake assembly.

11. The wheel spindle according to claim 10 wherein the plurality of wheel spindle splines substantially span an entire outside circumference of the large diameter portion.

12. The wheel spindle according to claim 10, including a roller bearing assembly for rotatably supporting the wheel, and a steering arm mounting member for bottom mounting the wheel spindle to a top of a steering arm platform, and wherein the large diameter portion is between the roller bearing assembly and the steering arm mounting member.

13. The wheel spindle according to claim 12, wherein the steering arm mounting member includes a key protruding downwardly from the steering arm mounting member for engaging with a key hole in the steering arm platform.

14. The wheel spindle according to claim 10, including a roller bearing assembly mounted on the wheel spindle for rotatably supporting the wheel, and wherein the large diameter portion is larger than a diameter of the wheel spindle where the roller bearing assembly is mounted on the wheel spindle.

15. A combination brake and wheel spindle, comprising:
- a wheel spindle, including a large diameter portion having a plurality of wheel spindle splines on an outside circumferential surface of the large diameter portion; and
- a wet brake assembly, including:
  - a brake anchor, including:
    - a brake anchor inboard annular portion on an inboard side of the brake anchor,
    - a brake anchor outboard annular portion on an outboard side of the brake anchor, and
    - a plurality of brake anchor splines on the brake anchor inboard annular portion;
  - wherein the wet brake assembly is axially mounted on the wheel spindle; and
  - wherein the plurality of wheel spindle splines are meshed with the plurality of brake anchor splines to form a mechanical spline joint so that the brake anchor is non-rotatably coupled to the wheel spindle.

16. The combination brake and wheel spindle according to claim 15, including a multiple disc brake pack having a plurality of brake discs, the multiple disc brake pack coupled to the outboard annular portion; a main brake piston housed in the brake anchor intermediate to the inboard annular portion and the outboard annular portion, and a port in the brake anchor for supplying a cooling fluid to the multiple disc brake pack.

17. The combination brake and wheel spindle according to claim 16, wherein the plurality of brake anchor splines on the brake anchor inboard annular portion are oriented in an axial direction of the brake anchor inboard annular portion, and the plurality of wheel spindle splines are oriented in an axial direction of the wheel spindle.

18. The combination brake and wheel spindle according to claim 17, wherein the plurality of brake anchor splines on the brake anchor inboard annular portion substantially span an entire inside circumference of the brake anchor inboard annular portion, and wherein the plurality of wheel spindle splines substantially span an entire outside circumference of the large diameter portion.

19. The combination brake and wheel spindle according to claim 16, wherein the multiple disc brake pack has non-rotatable brake discs fixed to the brake anchor outboard annular portion, the brake anchor outboard annular portion has a plurality teeth on a circumferential surface of the brake anchor outboard annular portion, and wherein the non-rotatable brake discs are fixed to the plurality teeth on the circumferential surface of the brake anchor outboard annular portion..

20. The combination brake and wheel spindle according to claim 16, further including a brake anchor reaction plate disposed on an outboard side of the multiple disc brake pack that opposes a force on the multiple disc brake pack when the main piston is urged against the multiple disc brake pack.

21. The combination brake and wheel spindle according to claim 16, further including a rotatable member rotatable with respect to the brake anchor, the rotatable member having an annular portion that opposes the brake anchor outboard annular portion, and wherein the multiple disc brake pack is disposed between the brake anchor outboard annular portion and the rotatable member, and wherein the multiple disc brake pack has rotatable brake discs fixed to the rotatable member.

22. The combination brake and wheel spindle according to claim 21, further including a wheel rotatably mounted on the wheel spindle, and wherein the rotatable member portion is a one-piece integral construction with the wheel.

23. The combination brake and wheel spindle according to claim 16, further including a split ring secured to an inboard face of the large diameter portion for preventing the wet brake assembly from sliding in an outboard direction of the wheel spindle.

24. The combination brake and wheel spindle according to claim 23, further including a seal disposed around the large diameter portion between an inboard side of the plurality of wheel spindle splines and an outboard side of the split ring, so a to create a radial seal between the wheel spindle and the brake anchor.

25. The combination brake and wheel spindle according to claim 24, including an oil flow path that passes near an outer periphery of the brake anchor and radially inwards through the multiple disc brake pack and between the mechanical spline joint, and wherein the seal prevents oil from leaking out an inboard side of the mechanical spline joint.

26. The combination brake and wheel spindle according to claim 16, further including a parking brake housing fixed to the brake anchor and abutting against a part of the wheel spindle for stopping the brake anchor from axially sliding in an inboard direction of the wheel spindle.

27. The combination brake and wheel spindle according to claim 16 further including a pin on one of the wheel spindle and the brake anchor and a corresponding hole on the other of the wheel spindle and the brake anchor for rotationally aligning the brake anchor with respect to the wheel spindle.

28. The combination brake and wheel spindle according to claim 16, further including a steering arm mounting member for bottom mounting the wheel spindle to a top of a steering arm platform.

29. The combination brake and wheel spindle according to claim 28 wherein the steering arm mounting member includes a key protruding downwardly from the steering arm mounting member for engaging with a key hole in the steering arm platform.

30. The combination brake and wheel spindle according to claim 15, further including an inboard roller bearing assembly and an outboard roller bearing assembly mounted on the wheel spindle; and a wheel mounted on the inboard and outboard roller bearing assemblies so as to be rotatable with respect to the wheel spindle; and wherein a load center line of the wheel passes through the wheel spindle at a position substantially centered with respect to the inboard and outboard roller bearing assemblies.

31. The combination brake and wheel spindle, according to claim 15, including a wheel mounted on the wheel spindle, and wherein the wheel spindle drives the wheel.

32. The combination brake and wheel spindle, according to claim 31, wherein the wheel spindle includes a reduction gear assembly to drive the wheel.

33. A combination brake and wheel spindle, comprising:
a wheel spindle, including a large diameter portion;
a wet brake assembly, including:
a brake anchor, including:
  a brake anchor inboard annular portion on an inboard side of the brake anchor,
  a brake anchor outboard annular portion on an outboard side of the brake anchor; and
  means for mounting the brake anchor to the wheel spindle by using a plurality of splines to form a mechanical spline joint so that the brake anchor is non-rotatably coupled to the wheel spindle.

34. An off-highway vehicle, comprising:
wheels that support the off-highway vehicle for rolling engagement with a ground,
a wheel spindle rotatably supporting at least one of the wheels, the wheel spindle including wheel spindle splines on outside circumferential surface of the wheel spindle;
a wet brake assembly, including a brake anchor having brake anchor splines on an inside circumferential surface of the brake anchor; and
a spline joint formed by a mesh between the wheel spindle splines and the brake anchor splines so that the wet brake assembly is non-rotatably coupled to the wheel spindle.

35. The combination brake and wheel spindle according to claim 34, wherein the wet brake assembly is cooled with a cooling fluid passing through the wet brake assembly.

* * * * *